US011746882B2

(12) United States Patent
Rosendahl et al.

(10) Patent No.: US 11,746,882 B2
(45) Date of Patent: Sep. 5, 2023

(54) SUCTION OIL FILTER FOR A TRANSMISSION OR COMBUSTION ENGINE

(71) Applicants: BOGE ELASTMETALL GMBH, Damme (DE); ZF FRIEDRICHSHAFEN AG, Friedrichshafen (DE)

(72) Inventors: Marco Rosendahl, Rieste (DE); Andreas Wehming, Damme (DE); Dominik Kuemper, Damme (DE); Stephan Brussa, Langenargen (DE)

(73) Assignees: BOGE ELASTMETTAL GmbH, Damme (DE); ZF FRIEDRICHSHAFEN AG, Friedrichshafen (DE)

( * ) Notice: Subject to any disclaimer, the term of this patent is extended or adjusted under 35 U.S.C. 154(b) by 983 days.

(21) Appl. No.: 16/336,101

(22) PCT Filed: Oct. 31, 2017

(86) PCT No.: PCT/EP2017/077930
§ 371 (c)(1),
(2) Date: Mar. 23, 2019

(87) PCT Pub. No.: WO2018/091267
PCT Pub. Date: May 24, 2018

(65) Prior Publication Data
US 2019/0285161 A1 Sep. 19, 2019

(30) Foreign Application Priority Data

Nov. 15, 2016 (DE) .......................... 102016121863.4

(51) Int. Cl.
*F16H 57/04* (2010.01)
*F01M 11/00* (2006.01)
(Continued)

(52) U.S. Cl.
CPC ......... *F16H 57/0404* (2013.01); *B03C 1/288* (2013.01); *F01M 1/10* (2013.01);
(Continued)

(58) Field of Classification Search
CPC . F16H 57/0404; B01D 29/00; B01D 35/0273; B01D 35/301; F01M 11/0004;
(Continued)

(56) References Cited

U.S. PATENT DOCUMENTS 6,464,863 B1 * 10/2002 Nguyen ............... B01D 35/027
210/DIG. 17
8,317,025 B1 * 11/2012 Kolozs .................... F42B 39/22
89/1.816
(Continued)

FOREIGN PATENT DOCUMENTS

DE 102012010939 A1 12/2013
DE 102012221554 A1 5/2014
(Continued)

OTHER PUBLICATIONS

English translation of DE 102012010939A originally published Dec. 5, 2013.*
(Continued)

*Primary Examiner* — Minh Truong
(74) *Attorney, Agent, or Firm* — COHEN & HILDEBRAND, PLLC

(57) ABSTRACT

A suction oil filter for a transmission or combustion engine including an oil filter housing made of plastic and having at least one suction channel that can be connected to a suction side of a suction pump and at least one return channel feeding into the suction channel for a pressurized oil flow returned by the suction pump. The return channel is provided with at least one nozzle in the region of the opening thereof into the suction channel, as well as at least one
(Continued)

pressurized oil supply pipe which is linked to the return channel and can be connected to a pressure side of the suction pump, and which is connected to the oil filter housing via at least one contour connection.

16 Claims, 4 Drawing Sheets

(51) Int. Cl.
  *B03C 1/28* (2006.01)
  *F16N 39/06* (2006.01)
  *F16N 39/00* (2006.01)
  *F01M 1/10* (2006.01)

(52) U.S. Cl.
  CPC ......... *F01M 11/0004* (2013.01); *F16N 39/00* (2013.01); *F16N 39/06* (2013.01); *F01M 2001/1078* (2013.01); *F01M 2011/007* (2013.01); *F01M 2011/0029* (2013.01); *F16N 2039/007* (2013.01); *F16N 2039/065* (2013.01)

(58) Field of Classification Search
  CPC ..... F01M 2001/1078; F01M 2011/007; F01M 2011/0033; F16N 39/06; F16N 2039/007
  See application file for complete search history.

(56) References Cited

U.S. PATENT DOCUMENTS

| | | | |
|---|---|---|---|
| D821,445 S * | 6/2018 | Buchen | D15/5 |
| 2006/0096808 A1* | 5/2006 | Rosenbaum | F01M 11/04 184/1.5 |
| 2007/0017745 A1* | 1/2007 | Rosendahl | F01M 11/0004 184/6.24 |
| 2014/0116931 A1* | 5/2014 | Beer | F01M 11/0004 210/196 |
| 2014/0144831 A1* | 5/2014 | Rosendahl | F16H 57/0404 264/271.1 |

FOREIGN PATENT DOCUMENTS

| | | | | |
|---|---|---|---|---|
| EP | 2324900 A1 | | 5/2011 | |
| FR | 2977805 A1 * | | 1/2013 | ......... B01D 35/0273 |
| FR | 2977805 A1 | | 1/2013 | |

OTHER PUBLICATIONS

International Search Report of PCT/EP2017/077030, dated Mar. 21, 2018.
Recherchenbericht (Search report of the German Patent Office, dated Dec. 6, 2017.

* cited by examiner

SUCTION OIL FILTER FOR A TRANSMISSION OR COMBUSTION ENGINE

This is an application filed under 35 USC § 371 of PCT/EP2017/077930, filed on Oct. 31, 2017 claiming priority to DE 10 2016 121 863.4, filed on Nov. 15, 2016, each of which is herein incorporated by reference in its entirety.

BACKGROUND OF THE INVENTION

The invention relates to a suction oil filter for a transmission or internal combustion engine, with an oil filter housing made of plastic, which has at least one suction channel connectable with a suction side of a suction pump and at least return channel feeding into the suction channel for a pressurized oil flow returned from the suction pump, wherein the return channel is provided in the region of its opening into the suction channel with at least one nozzle, and at least one pressurized oil supply pipe connected to the return channel and connectable with a pressure side of the suction pump.

DE 10 2012 010 939 A1 discloses a suction oil filter unit for gearboxes or internal combustion engines with an oil filter housing made of plastic, having at least one suction channel connectable to a suction pump and at least one return channel for a pressurized oil volume flow returned from the suction pump for the purpose of suction charging of the pump suction oil flow, wherein the return channel is provided in the region of its opening into the suction channel with at least one nozzle device having at least one nozzle body inserted into the return channel and not being formed integrally with the return channel. The nozzle body is held in the installed position between a circumferential shoulder of the opening of the return duct and a pressurized oil supply pipe which is inserted in a sleeve-like flared section of the return channel.

In conventional suction oil filters with integrated suction charging, the pressurized oil supply pipe for returning the oil flow to the top of the oil filter housing is screwed together in several places with screws and brass sleeves, resulting in relatively high production costs.

Proceeding from this, it is the object of the invention to reduce manufacturing costs for a suction filter of the aforementioned type.

BRIEF SUMMARY OF THE INVENTION

The suction oil filter according to the invention for a transmission or internal combustion engine has an oil filter housing made of plastic, with one or at least one suction channel connectable to a suction side of a suction pump and one or at least one return channel feeding into the suction channel for a pressurized oil flow returned from the suction pump, in particular for the purpose of charging a suction oil flow drawn by the suction pump, wherein the return channel has in the region of its opening into the suction channel at least one nozzle, and one or at least one pressurized oil supply pipe connected to the return channel and connectable to a pressure side of the suction pump, wherein the pressurized oil supply pipe is positively connected with the oil filter housing via one or at least one contour connection.

The one or the at least one contour connection can thus at least partially or even completely obviate the need for screw connections with screws and brass sleeves known in the art, thus reducing material and assembly costs. Thus, the production costs can be significantly reduced.

In particular, oil is introduced into the oil filter housing. Preferably, the oil filter housing includes a housing interior, in which the oil is preferably introduced. Advantageously, the oil or a part of the oil or at least a part of the oil introduced into the oil filter housing can be suctioned through the suction channel by the suction pump. The oil suctioned by the suction pump forms in particular the or a suction oil flow. Preferably, a return oil flow is returned by the suction pump to the oil filter housing and/or to the housing interior. This generates in particular an oil circuit. Preferably, the pressurized oil flow forms part of the return oil flow. Preferably, the pressurized oil flow is branched off from the return oil flow. The return oil flow reduced by the pressurized oil flow is more specifically referred to as main return oil flow. The main return oil flow is preferably returned to the oil filter housing and/or to the housing interior.

Cavitation can occur in a suction oil flow suctioned by the suction pump, which can damage the suction pump. In order to avoid or reduce the occurrence of cavitation, the pressurized oil flow returned by the suction pump is injected into the suction oil flow through the nozzle, in particular within the suction channel, which is also referred to as charging the suction oil flow. Instead of the term charging, the terms suction charging or intake charging can also be used. The suction pump is preferably a centrifugal pump or vane pump.

The one or the at least one contour compound preferably includes one or at least one oil filter housing-side connecting part and one or at least one pressurized oil supply pipe-side connecting part. Preferably, the one or the at least one oil filter housing-side connecting part and the one or at least one pressurized oil supply pipe-side connecting part engage positively each other.

The one or at least one oil filter housing-side connecting part is preferably formed concurrently with the manufacture of the oil filter housing, for example in an injection mold. Thus, the one or the at least one oil filter housing-side connecting part can be produced at low cost. Preferably, the oil filter housing is an injection molded part and/or the oil filter housing is assembled from injection molded parts. Advantageously, the oil filter housing together with the one or the at least one oil filter housing-side connecting part forms a monolithic component.

According to one development, the oil filter housing has two half shells. In particular, the oil filter housing is composed of two half shells or of the half shells. Preferably, the half shells are interconnected, in particular at their edge, preferably solid and/or rigid and/or with a material fit and/or liquid-tight. Advantageously, the half-shells delimit a housing interior of the oil filter housing. Preferably, the half shells are each made of plastic. In particular, each of the half shells is an injection molded part.

Preferably, the pressurized oil supply pipe is positively connected by way of the one or the at least one contour connection to a first of the half shells. Advantageously, the one or the at least one oil filter housing-side connecting part formed concurrently with the manufacture of the first half-shell, for example in an injection mold. Advantageously, the first half shell together with the one or the at least one oil filter housing-side connecting part forms a monolithic component.

Preferably, the pressurized oil supply pipe is composed of plastic. In particular, the pressurized oil supply pipe is an injection molded part. Advantageously, the one or the at least one pressurized oil supply pipe-side connecting part is formed concurrently with the manufacture of the pressurized oil supply pipe, for example in an injection mold. Advantageously, the pressurized oil supply pipe together with the one or the at least one pressurized oil supply pipe-side connecting part forms a monolithic component.

According to a further development, the one or the at least one contour connection includes one or several sliding guides. Advantageously, the or the at least one contour connection and/or the one or the at least one sliding guides include one or more dovetail joints and/or one or more dovetail guides and/or one or more rail guides. Advantageously, the one or each of the sliding guides is formed as a dovetail joint or as a dovetail guide or as a rail guide. Thus, it is possible to connect the pressurized oil supply pipe and the oil filter housing by pushing them together. In particular, the pressurized oil supply pipe is pushed onto the oil filter housing.

According to one embodiment, the return channel extends in a return channel direction. Preferably, the inner cross section of the return channel is constant along the return channel direction.

Preferably, the return channel is formed rotationally symmetrical or substantially rotationally symmetrical with respect to a return channel axis extending in particular in the return channel direction. For example, the return channel, preferably the entire return channel, is cylindrical. The return channel has preferably a flow-optimized and pressure-optimized cross section or inner cross section. Preferably, the return channel has a circular or an oval cross section or inner cross section.

According to a further development, the one or each of the sliding guides and/or dovetail connections and/or dovetail guides and/or rail guides extends in or approximately in the return channel direction. Thus, it becomes easy to connect the pressurized oil supply pipe to the return channel during assembly.

Preferably, the one or the at least one contour compound and/or the one or each of the sliding guides has one or at least one engagement element and one or at least one counter-engagement element, which meshes in particular form-fittingly with the respective counter-engagement element. The engagement element(s) is/are preferably provided on the pressurized oil supply pipe. Preferably, the one or the at least one pressurized oil supply pipe-side connecting part forms or includes the one or each of the engagement elements.

The counter-engagement element(s) is/are preferably provided on the oil filter housing and/or on the first half-shell. Preferably the one or the at least one oil-filter-housing-side connection part forms or includes the one or each of the counter-engagement elements. The one or each of the engagement elements is e.g., formed as a sliding element or as a groove. Furthermore, the one or each of the counter-engagement elements is formed e.g., as a groove or as a sliding element. Preferably, the one or each sliding element engages in the one or the at least one of the grooves, in particular in a form-fitting manner. In particular, the groove or grooves extend(s) in or approximately in the return channel direction.

Preferably, the pressurized oil supply pipe is additionally connected by one or by at least one snap connection with the oil filter housing and/or the return channel. This prevents movement of the pressurized oil supply pipe relative to the oil filter housing, for example in the direction of the sliding guides. The snap engagement or snap connection is preferably a plastic snap connection.

According to one embodiment, the pressurized oil supply pipe is additionally connected to the oil filter housing and/or the return channel by one or at least one, in particular self-tapping, screw connection. In this way, the pressurized oil supply pipe can be additionally secured to the oil filter housing. In particular a sleeve, such as a brass sleeve, can be dispensed with when using a self-tapping screw.

According to a further development, the pressurized oil supply pipe is inserted into the return channel, in particular together with the nozzle. The region or end section of the pressurized oil supply pipe inserted in the return channel is sealed at its outer periphery against the inner periphery of the return channel in particular by a seal. Preferably, the nozzle is arranged in the suction channel and the pressurized oil supply pipe between the opening of the return channel. Advantageously, the nozzle is arranged between an in particular circumferential shoulder of the opening of the return channel and the pressurized oil supply pipe.

In particular, the nozzle includes a nozzle body, through which a nozzle opening extends. Preferably, the nozzle opening is tapered from the pressurized oil supply pipe-side end to its opening-side end. The nozzle and/or the nozzle body is sealed at its outer periphery against the inner circumference of the return channel, in particular by a seal. The nozzle and/or the nozzle body is preferably made of plastic. In particular, the nozzle is an injection molded part.

According to one embodiment, the nozzle is connected to the pressurized oil supply pipe, in particular in a fixed and/or rigid manner. Advantageously, the nozzle is connected with the pressurized oil supply pipe so that it can be detached. Preferably, the nozzle is latched or positively locked with the pressurized oil supply pipe, in particular by a locking contour. For example, the nozzle is pushed into and/or inserted in and/or interlocked with a locking region provided on an end of the pressurized oil supply pipe facing the return channel. This can ensure an aligned installation of the nozzle in the return channel.

Preferably, the pipe interior of the pressurized oil supply pipe forms a flow channel. In particular, the pressurized oil flow returned by the suction pump through the flow channel to the nozzle and/or to the return channel can be supplied. Preferably, the transition between the pressurized oil supply pipe and the nozzle is designed such that the flow channel transitions continuously into the nozzle opening. Preferably, the pipe interior of the pressurized oil supply pipe and/or the flow channel has an oval cross-section at least at its end section facing the nozzle. In this way, in particular, a continuous transition of the flow channel into the nozzle opening can be realized while at the same time having a large cross-sectional area of the flow channel. Furthermore, in particular a high strength of the pressurized oil supply pipe in its end section facing the nozzle is thus achieved. Instead of an oval cross-section, another cross-section is feasible, which in particular has different dimensions and/or lengths in two mutually perpendicular directions.

Preferably, the pressurized oil supply pipe has a curved section, which is formed in particular by the end section or by one of the end sections of the pressurized oil supply pipe facing the nozzle. Preferably, the pressurized oil supply pipe thus has a curved shape at its end section facing the nozzle. Advantageously, the pressurized oil supply pipe has a straight section abutting the curved section. Preferably, the pipe interior of the pressurized oil supply pipe and/or the flow channel has a cross section in the straight section that changes along the longitudinal extent of the straight section, in particular a cross section that changes from an oval cross section to a circular cross section.

According to one embodiment, the suction channel extends in a suction channel direction. Preferably, the inner cross section of the suction channel is constant along the suction channel direction. Preferably, the suction channel is rotationally symmetrical or substantially rotationally symmetrical with respect to a suction channel direction extending in particular in the suction channel axis. For example, the suction channel is cylindrical preferably in its entirety.

Preferably, the pressurized oil supply pipe extends at its end facing away from the return channel in or approximately in the suction channel direction. Preferably, the straight section of the pressurized oil supply pipe extends in or approximately in the suction channel direction. The suction channel and the pressurized oil supply pipe can hence be connected to the suction pump from the same side.

According to a further development, the pressurized oil supply pipe has a magnet receptacle constructed to hold one or at least one magnet. The one or the at least one magnet is used in particular to capture magnetic or magnetizable particles present in the oil. Such particles are formed, for example by abrasion, in the transmission or in the internal combustion engine. The one or the at least one magnet may be an electromagnet. Preferably, the one or the at least one magnet is a permanent magnet. Thus, no electrical power supply is required for the one or the at least one magnet. Furthermore, the effect of a permanent magnet is independent of any power failure. The magnet receptacle is made in particular of plastic. Advantageously, the pressurized oil supply pipe together with the magnet receptacle and/or with the one or the at least one pressurized oil supply pipe-side connecting part forms a monolithic component. The snap engagement or snap connection is provided, for example, between the magnet receptacle and the oil filter housing or the pressurized oil supply pipe. For example, the pressurized oil supply is additionally locked with a snap connection against disengagement preferably from the oil filter housing and/or the return channel by way of the one or the at least one magnet and/or the magnet receptacle. This snap connection is in particular a plastic snap connection.

According to one embodiment, one or at least one filter medium is provided in the oil filter housing and/or in the housing interior. In particular, the oil introduced into the oil filter housing and/or into the housing interior can be filtered by the one or the at least one filter medium. Preferably, the filter medium is disposed between the suction oil flow and the main return oil flow. Advantageously, the one or the at least one filter medium is fixed between the half-shells, in particular at the edge. The one or the at least one filter medium is or preferably includes one or at least one filter fleece.

According to a further development, the oil filter housing has an oil return opening that can be connected to and/or attached to the pressure side of the suction pump, which serves in particular to return a part of or at least a part of the oil suctioned by the suction pump. Preferably, the return oil flow and/or the main return oil flow is supplied to the oil filter housing and/or to the housing interior through the oil return opening. Advantageously, the oil return opening and the suction channel are disposed on different sides of the one or the at least one filter medium. The oil return opening may be arranged in the first half shell. Preferably, however, the oil return opening is arranged in the first or in a second of the half shells.

A preferred embodiment of the invention will now be described with reference to the drawing, which shows in:

DETAILED DESCRIPTION OF THE INVENTION

Figure 1:
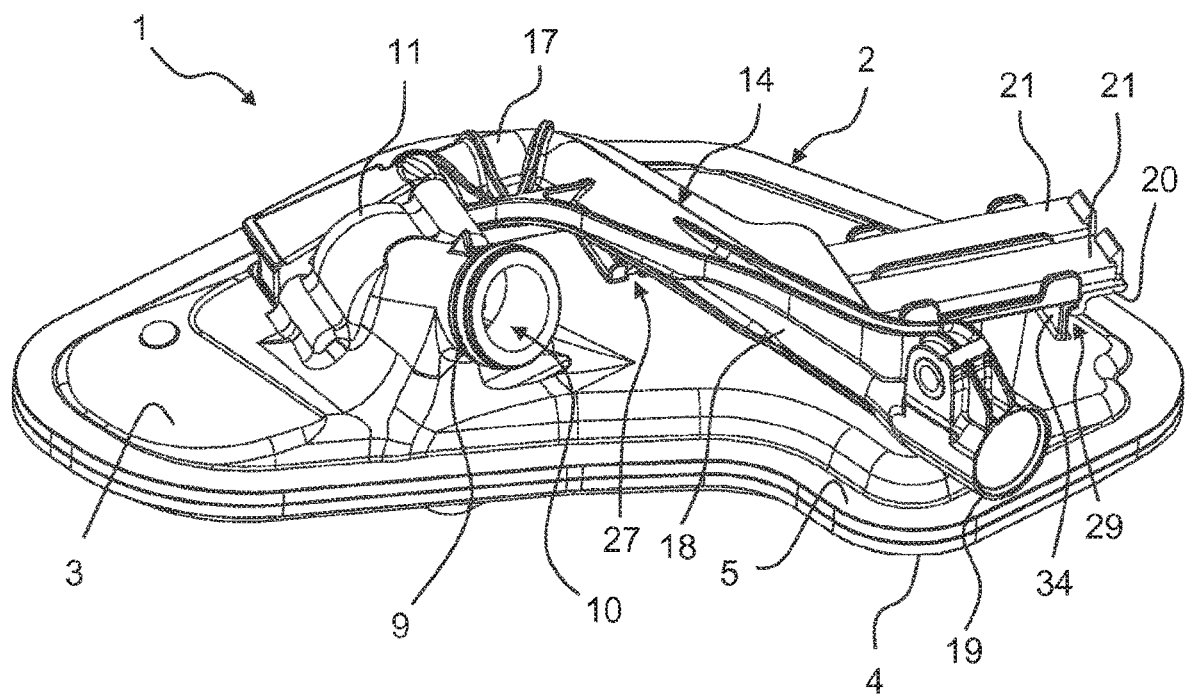
FIG. 1 a perspective view of a suction oil filter according to an embodiment.
Figure 2:
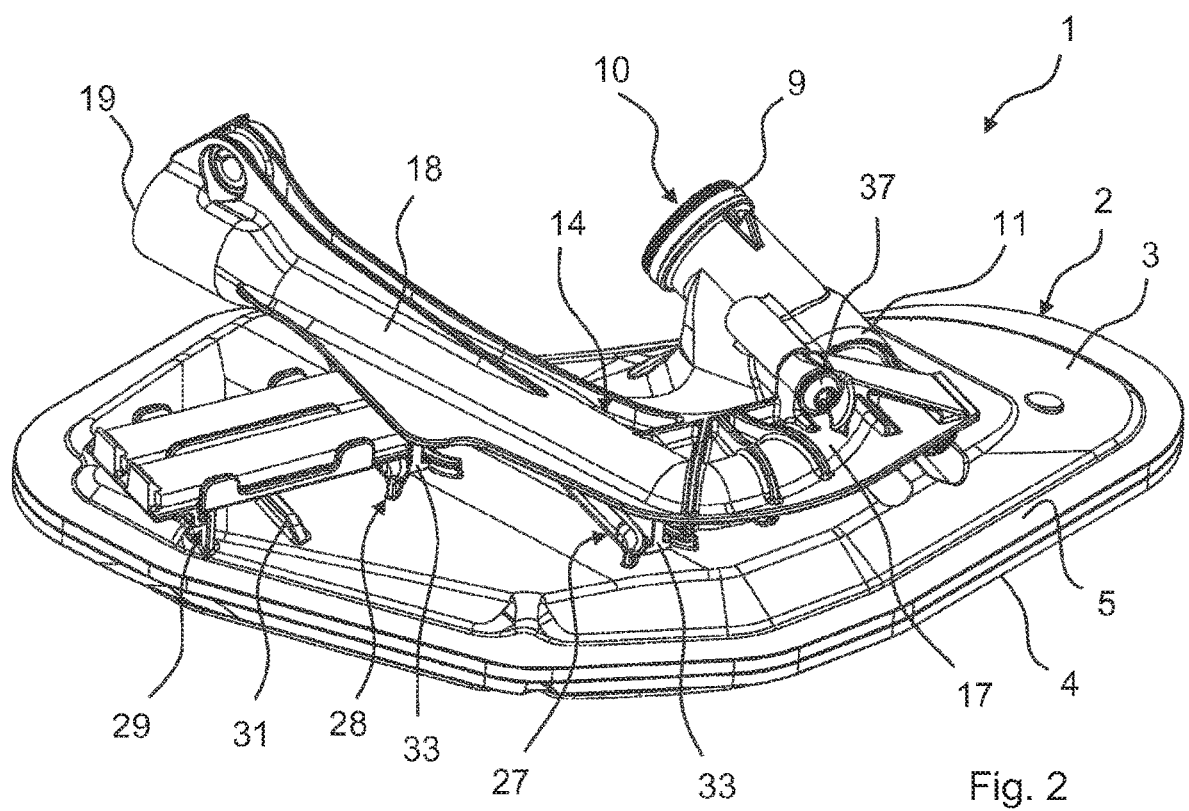
FIG. 2 another perspective view of the suction oil filter.
Figure 3:
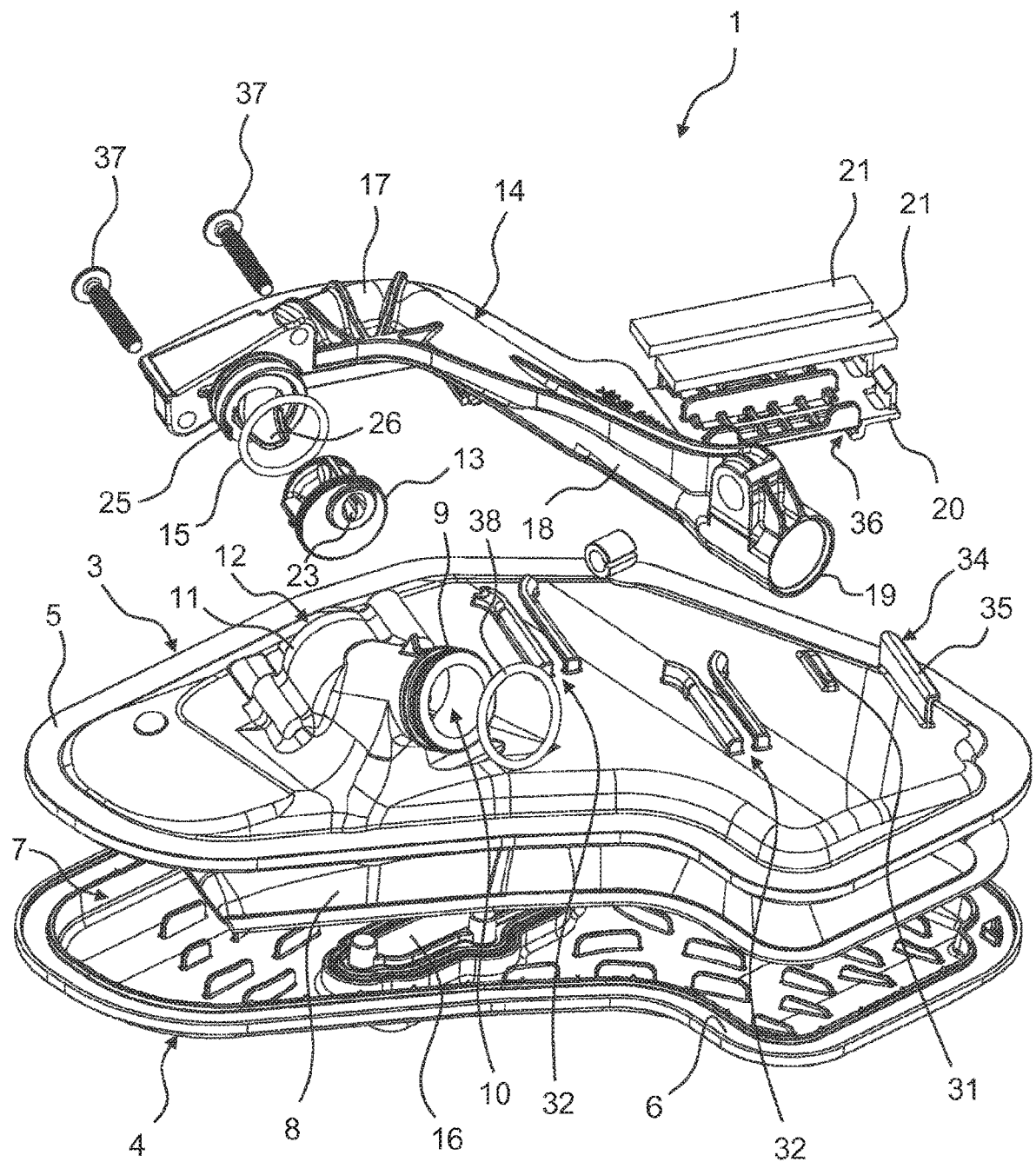
FIG. 3 a perspective exploded view of the suction oil filter.

FIGS. 1 to 3 show different views of a suction oil filter 1 according to one embodiment, which has an oil filter housing 2 composed of two plastic half-shells 3 and 4, which are circumferentially welded together along their edges 5 and 6. The plastic half shells 3 and 4 delimit a housing interior 7 of the oil filter housing 2, in which a filter medium 8 in the form of a filter fleece is introduced. Furthermore, oil is introduced into the housing interior 7.

A suction nozzle 9, which forms a or part of a suction channel 10 that is or can be connected to a suction side of a suction pump is integrally formed on the outside of a first of the plastic half-shells 3. The suction channel 10 is provided for supplying or passing through a suction oil flow suctioned by the suction pump. Furthermore, a pressure nozzle 11 which forms a return channel 12 or part of a return channel 12 that opens into the suction channel 10 is integrally formed on the outside of the first plastic half-shell 3. The return channel 12 serves to supply or pass through a pressurized oil flow returned from the suction pump for the purpose of charging the suction oil flow.

A nozzle 13 made of plastic and a pressurized oil supply pipe 14 made of plastic are inserted in the return channel 12, wherein the nozzle 13 is arranged between the opening of the return passage 12 into the suction passage 10 and the pressurized oil supply pipe 14, which is connected or connectable with a pressure side of the suction pump. Furthermore, the end section of the pressurized oil supply pipe 14 inserted in the return channel 12 is sealed at its outer periphery against the inner periphery of the return passage 12 by a seal 15. Likewise, a seal 38 is associated with the suction channel 10 with which the suction channel 10 is or can be sealed against a connecting line connecting or configured to connect the suction channel 10 to the suction side of the suction pump.

An oil return opening 16 is provided in a second of the plastic half-shells 4, which is or can be connected to the pressure side of the suction pump. The oil return opening 16 is used to return the oil suctioned by the suction pump, which is discharged from the pump as a return oil flow, from which the pressurized oil flow is diverted. The pressurized oil flow reduced by the return oil flow is referred to as main return oil flow and is supplied to the housing interior 7 through the oil return opening 16. The oil return opening 16 and the suction channel 10 are disposed on different sides of the filter medium 8.

Figure 4:
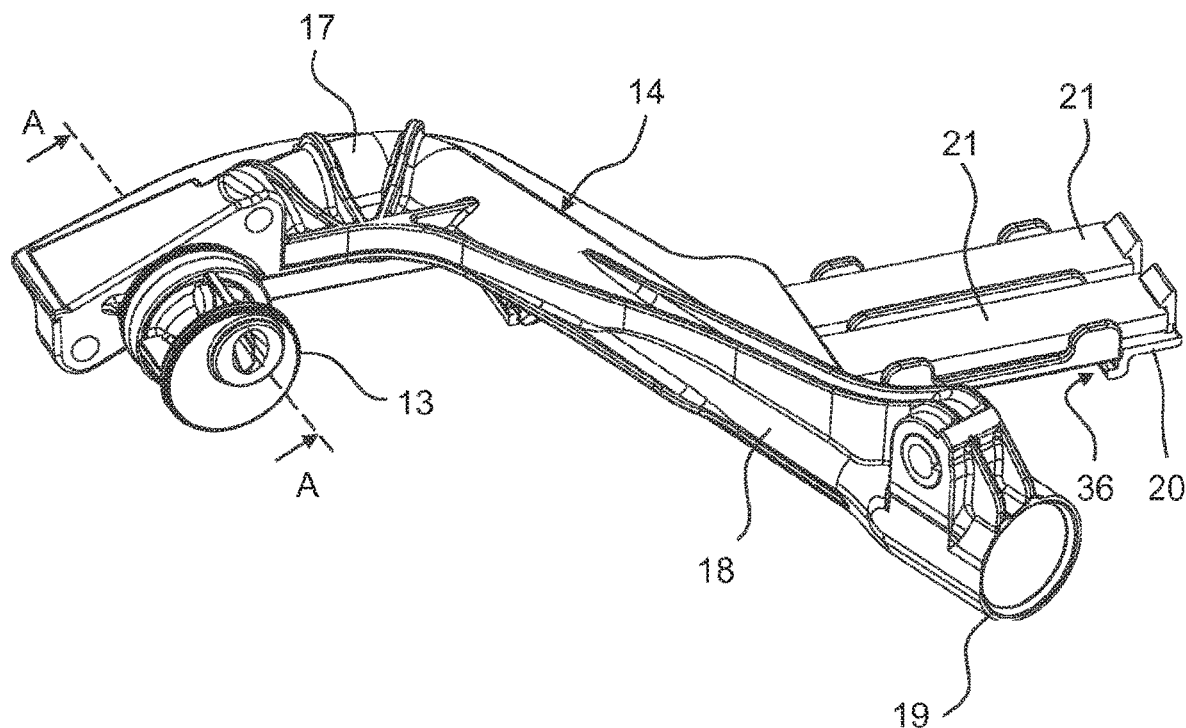
FIG. 4 a perspective view of a pressurized oil supply pipe and suction oil filter with a connected nozzle, FIG. 5 a sectional view of the pressurized oil supply pipe and the nozzle along a section line A-A indicated in FIG. 4, FIG. 6 a perspective view of a suction oil filter housing of the suction oil filter and of the pressurized oil supply pipe before its assembly on the suction oil filter housing, and FIG. 7 a perspective view of the suction oil filter housing and of the pressurized oil supply pipe in a partially assembled state and of two screws.

FIG. 4 shows the pressurized oil supply pipe 14 together with the nozzle 13 in a perspective view, having a curved section 17 formed by the end region of the pressurized oil supply pipe 14 facing the nozzle 13, and a straight section 18 abutting the curved section 17, with the free end 19 of the straight section 18 connected or connectable to the pressure side of the suction pump. By virtue of the curvature of the pressurized oil supply pipe 14, the suction channel 10 and the pressurized oil supply pipe 14 can be connected to the suction pump from the same side. The pressurized oil supply pipe 14 includes an integrally molded magnet receptacle 20 holding two permanent magnets 21 with which magnetic or magnetizable particles are or can be captured in the oil.

Figure 5:
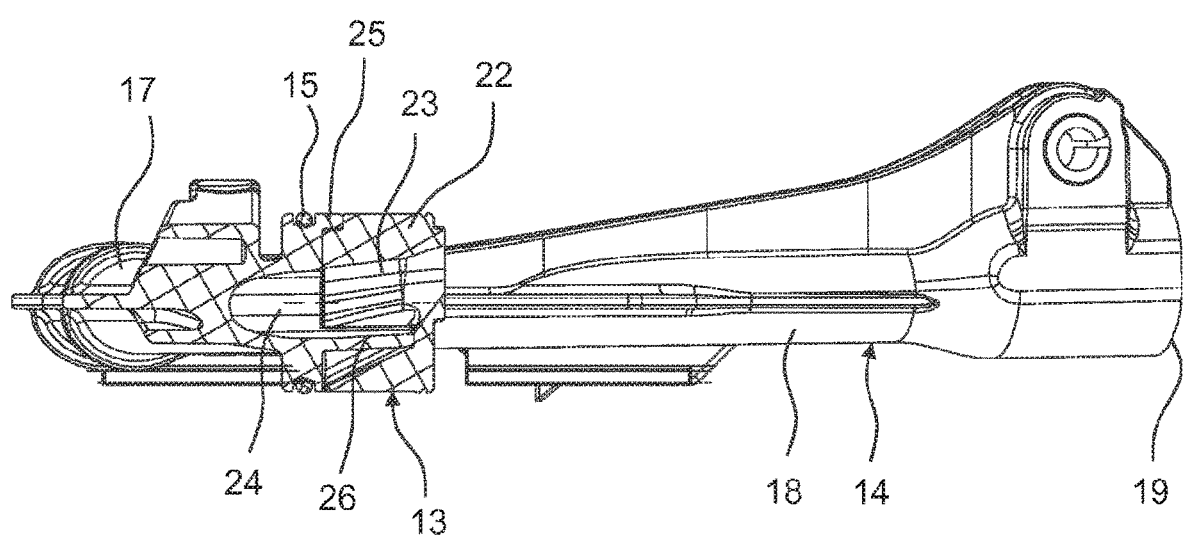

FIG. 5 shows a sectional view of the pressurized oil supply pipe 14 and the nozzle 13 along a section line A-A shown in FIG. 4. The nozzle 13 includes a nozzle body 22 through which a nozzle opening 23 extends. Furthermore, the pipe interior of pressurized oil supply pipe 14 forms a flow channel 24 through which the pressurized oil flow returned by the suction pump can be supplied to the nozzle 13 and/or the return channel 12. The flow channel 24 has an oval cross-section in the curved section 17 and continuously transitions at its end region facing the nozzle 13 into the nozzle opening 23. Furthermore, the flow channel 24 has in the straight section 18 a cross section that changes along the longitudinal extent of the straight section and changes from an oval cross section to a circular cross section at its free end 19.

The end of the pressurized oil supply pipe 14 facing the nozzle 13 has a locking section 25 into which the nozzle 13 is inserted and thereby locked with the pressurized oil supply pipe 14. Furthermore, the end of the pressurized oil supply pipe 14 facing the nozzle 13 has a tongue 26 which engages in the nozzle opening 23. The tongue 26 facilitates a continuous transition between the flow channel 24 and the nozzle opening 23.

The pressurized oil supply pipe 14 is positively connected with the oil filter housing 2 by several sliding guides 27, 28 and 29, which extend in or approximately in a return channel direction 30 (see FIG. 6), in which the return channel 12 extends. The sliding guides 27 and 28 are designed as dovetail guides. Furthermore, the pressurized oil supply pipe 14 is connected to the oil filter housing 2 in the region of the magnetic receptacle 20 by a snap connection. For this purpose, the magnet receptacle 20 has on its underside a snap element, which engages behind a projection 31 disposed on the outside of the oil filter housing 2. To form the dovetail guides 27 and 28, grooves 32 extending in the or approximately in the return channel direction 30 are provided on the outside of the oil filter housing 2, in which sliding elements 33 provided on the pressurized oil supply pipe 14 engage. To form the sliding guide 29, an L-shaped rail 34 extending in or approximately in the return channel direction 30 is provided on the outside of the oil filter housing 2, with a bend 35 of the L-shaped rail 34 laterally engaging in a groove 36 provided on the underside of the magnet receptacle 20. For added safety, the pressurized oil supply pipe 14 is screwed together with the pressure nozzle 11 by self-tapping screws 37.

Figure 6:
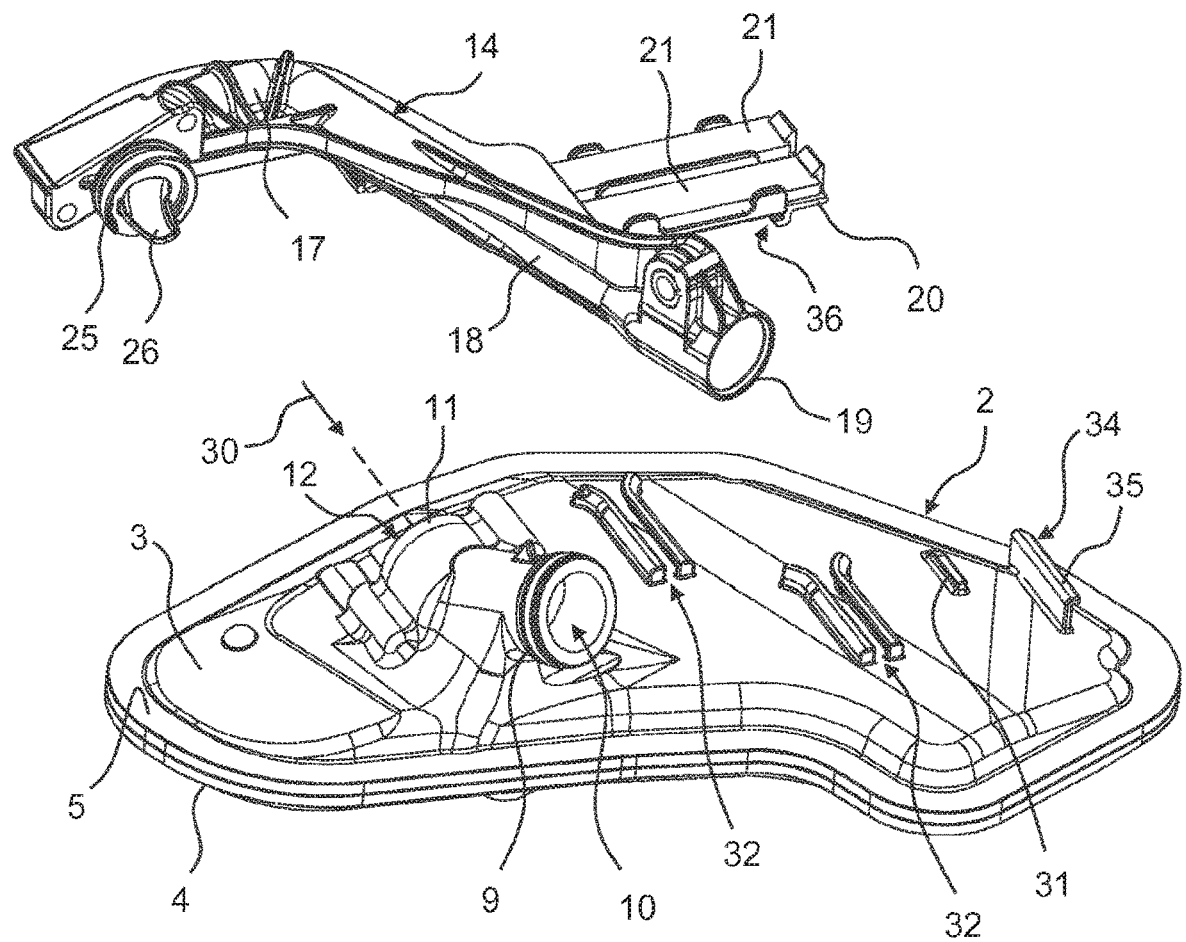
Figure 7:
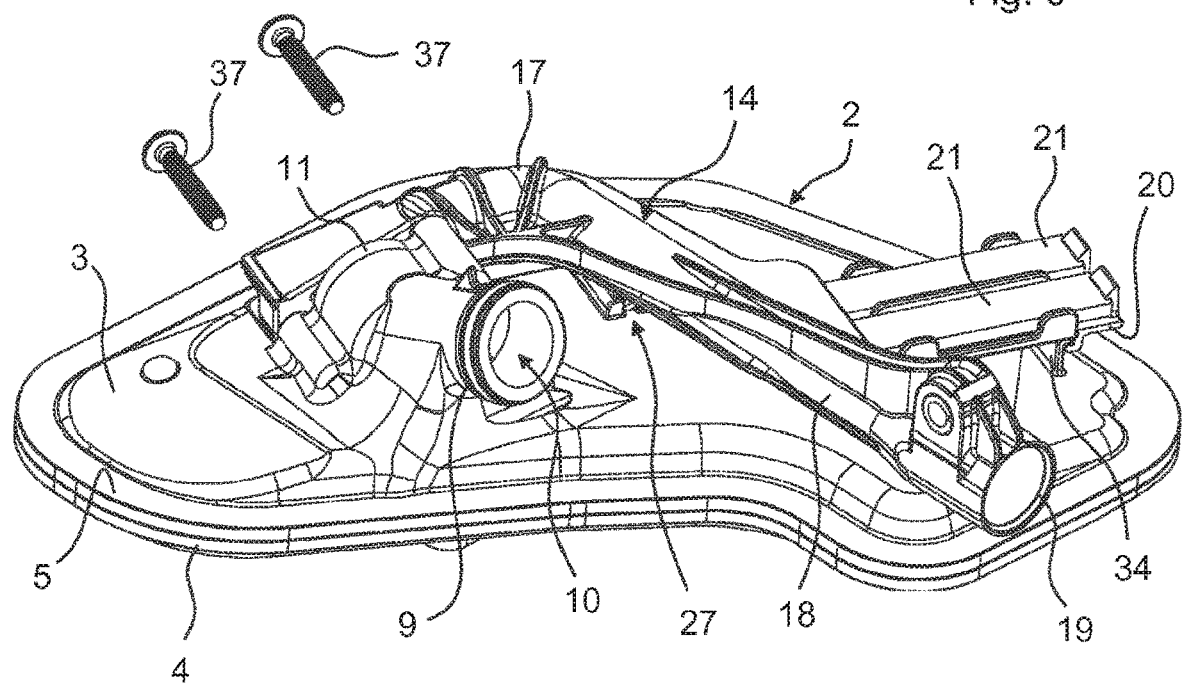

The assembly of pressurized oil supply pipe 14 is described in particular with reference to FIGS. 6 and 7, wherein FIG. 6 shows a perspective view of the suction oil filter housing 2 and of the pressurized oil supply pipe 14 before being mounted on the suction oil filter housing 2. Furthermore, FIG. 7 shows a perspective view of the suction oil filter housing similar and of the pressurized oil supply pipe in a partially assembled state as well as two screws.

The pressurized oil supply pipe 14 is mounted on the oil filter housing 2 by first locking the nozzle 13 on the pressurized oil supply pipe 14 and/or on the locking area 25. Subsequently, the pressurized oil supply pipe 14 is inserted with its sliding elements 33 into the grooves 32. Furthermore, the bend 35 of the rail 34 is inserted into the groove 36. The pressurized oil supply pipe 14 is now pushed in or approximately in the return channel direction 30 until the snap element provided on the underside of the magnet receptacle 20 engages behind the projection 31. During the pushing motion, first the nozzle 13 and then the end section of pressurized oil supply pipe 14 facing the nozzle 13 and/or the return channel 12 are inserted into the return opening 12. Thereafter, the pressurized oil supply pipe 14 is screwed to the pressure nozzle 11 with screws 37. Finally, the two plastic half-shells 3 and 4 are welded together.

LIST OF REFERENCE NUMBERS 1 suction oil filter
2 oil filter housing
3 first half shell of the oil filter housing
4 second half-shell of the oil filter housing
5 edge of the first half shell
6 edge of the second half shell
7 housing interior
8 filter medium
9 suction nozzle
10 suction channel
11 pressure nozzle
12 return channel
13 nozzle
14 pressurized oil supply pipe
15 seal
16 oil return opening
17 curved section of the pressurized oil supply pipe
18 straight section of the pressurized oil supply pipe
19 free end of the straight section
20 magnet receptacle
21 permanent magnet
22 nozzle body
23 nozzle opening
24 flow channel
25 locking area
26 tongue
27 sliding guide
28 sliding guide
29 sliding guide
30 return channel direction
31 projection
32 groove
33 sliding element
34 rail
35 bend of the rail
36 groove
37 screws
37 seal

The invention claimed is:

1. A suction oil filter for a transmission or an internal combustion engine, comprising:
an oil filter housing (2) made of plastic having at least one suction channel (10) connectable to a suction side of a suction pump and at least one return channel (12) opening into the suction channel (10) for a return pressurized oil flow returned by the suction pump,
wherein the return channel (12) comprises at least one nozzle (13), and at least one pressurized oil supply pipe (14) connected to the return channel (12) and connectable to a pressure side of the suction pump, wherein the nozzle (13) is in a region of an opening into the suction channel (10) outside the at least one pressurized oil supply pipe (14), wherein aside from the return channel (12) the pressurized oil supply pipe (14) is positively connected to an outer surface of the oil filter housing (2) by way of at least one contour connection.

2. The suction oil filter according to claim 1, wherein the pressurized oil supply pipe (12) is made of plastic.

3. The suction oil filter according to claim 1, wherein the at least one contour connection comprises one or more sliding guides (27, 28, 29).

4. The suction oil filter according to claim 3, wherein the one or more sliding guides comprise one or more dovetail guides (27, 28) and/or one or more rail guides (29).

5. The suction oil filter according to claim 3, wherein the one or each of the sliding guides (27, 28, 29) extends in or approximately in a return channel direction (30) in which the return channel (12) extends.

6. The suction oil filter according to claim 1, wherein aside from the suction channel (12), the pressurized oil supply pipe (14) is additionally connected to the outer surface of the oil filter housing (2) by at least one snap connection.

7. The suction oil filter according to claim 6, wherein the snap connection is provided between a magnetic receptacle (20) and the oil filter housing (2).

8. The suction oil filter according to claim 1, wherein the pressurized oil supply pipe (14) is additionally connected to the oil filter housing (2) by at least one self-tapping screw.

9. The suction oil filter according to claim 1, wherein the pressurized oil supply pipe (14) is inserted together with the nozzle (13) into the return passage (12).

10. The suction oil filter according to claim 1, wherein the nozzle (13) is latched with the pressurized oil supply pipe (14).

11. The suction oil filter according to claim 1, wherein the pipe interior of the pressurized oil feed pipe (14) forming a flow channel (24) has an oval cross-section at least in its end region facing the nozzle (13).

12. The suction oil filter according to claim 1, wherein the pressurized oil supply pipe (14) has a magnet receptacle (20) retaining at least one magnet (21).

13. The suction oil filter according to claim 12, wherein a snap connection is provided between the magnetic receptacle (20) and the oil filter housing (2).

14. The suction oil filter according to claim 1, further comprising at least one filter medium (8), with which oil introduced into the oil filter housing (2) is being filtered, is provided in the oil filter housing (2).

15. The suction oil filter according to claim 14, wherein the oil filter housing (2) comprises an oil return opening (16) connectable to the pressure side of the suction pump for returning at least part of the oil suctioned by the suction pump, wherein the oil return opening (16) and the suction channel (10) are disposed on different sides of the filter medium (8).

16. The suction oil filter according to claim 1, wherein the pressurized oil supply pipe (14) comprises:
a curved section (17) connected to the return channel (12); and
a straight section (18) one of which is connected to the curved section (17) and an opposite end terminating in a free end (19);
wherein the straight section (18) of the pressurized oil supply pipe (14) extends in or approximately in a return channel direction (30) in which the return channel (12) extends.

* * * * *